United States Patent [19]
Unnithan

[11] Patent Number: 5,932,261
[45] Date of Patent: Aug. 3, 1999

[54] REFINING OF EDIBLE OIL RICH IN NATURAL CAROTENES AND VITAMIN E

[75] Inventor: Unnikrishnan Ramachandran Unnithan, Johor Darul Takzim, Malaysia

[73] Assignee: Global Palm Products Sdn. Bhd., Pasir Gudang, Malaysia

[21] Appl. No.: 08/745,569

[22] Filed: Nov. 8, 1996

[30] Foreign Application Priority Data

Oct. 31, 1996 [MY] Malaysia ............................ PI-9604534

[51] Int. Cl.$^6$ ...................................... A23D 9/00
[52] U.S. Cl. ........................ 426/417; 426/488; 426/492; 554/29; 203/86
[58] Field of Search ...................... 426/492, 493, 426/494, 486, 487, 488, 386, 387, 417; 554/29; 203/86

[56] References Cited

U.S. PATENT DOCUMENTS

| | | | |
|---|---|---|---|
| 4,004,041 | 1/1977 | Koslowsky | 426/417 |
| 4,036,865 | 7/1977 | Hartman | 426/488 |
| 4,126,709 | 11/1978 | Johnson | 426/492 |
| 4,789,554 | 12/1988 | Scavone | 426/487 |
| 4,804,555 | 2/1989 | Marschner | 426/488 |
| 4,810,330 | 3/1989 | Stage | 426/488 |
| 5,019,668 | 5/1991 | Keat | 426/540 |
| 5,045,200 | 9/1991 | Brook | 426/417 |
| 5,073,389 | 12/1991 | Kuss | 426/417 |
| 5,374,751 | 12/1994 | Cheng | 426/488 |
| 5,405,633 | 4/1995 | Heidlas | 426/417 |

FOREIGN PATENT DOCUMENTS

A-31084/89 9/1989 Australia .

OTHER PUBLICATIONS

Brochure *Short–Path Distillation: From Laboratory to Production* UIC, Inc. Joliet, IL (1990).
Brooker, S.G. et al., "The Deacidification of Coconut Oil by Short–Path Distillation," *New Zealand J. Science and Technology* 33B(488):488–492 (1952).
Hartman, L., "Desacidificazione di oli commestibili con la distillazione a corta distanza," *La Rivista Delle Sostanze Grasse* 55(6):191–192 (1967).
Hollo, J. et al., "Possibilita della distillazione molecolare come metodo di separazione nell'industria degli oli vegitali," *La Rivista Delle Sostanze Grasse* 55(6):249–259 (1967).
Ooi, C.K. et al., "Recovery of Carotenoids from Palm Oil," *JAOCS* 71(4):423–426 (1994).
Ooi, T.L. et al., "Extraction of Carotenes from Palm Oil," *JJOCS* 35(7):543–548 (1986).
Tandy, D.C. et al., "Physical Refining of Edible Oil," *JAOCS* 61(7):1253–1258 (1984).

*Primary Examiner*—Carolyn Paden
*Attorney, Agent, or Firm*—Townsend and Townsend and Crew LLP

[57] ABSTRACT

The invention discloses a process for the production of a natural carotene rich refined and deodorised oil by subjecting the oil to a pressure of less than 0.060 mbar and to a temperature of less than 200° C. and wherein the process includes the steps of distilling the oil in a short-path distiller at a temperature range of 160° C.–290° C. and at pressures of 0.003 mbar to 0.08 mbar and removing free fatty acids (FFA) in the oil by condensation within the distiller. The FFA is removed by subjecting the mixture of the oil and the FFA to an internal condensor system operating at a temperature greater than the melting point of FFA in the oil. The process yields in refined, deodorised oil, in particular palm oil where the carotene and Vitamin E contained the feed oil is substantially retained in the processed oil.

11 Claims, No Drawings

REFINING OF EDIBLE OIL RICH IN NATURAL CAROTENES AND VITAMIN E

BACKGROUND OF THE INVENTION

This invention relates to a process of refining edible oil rich in naturally occurring carotenes and Vitamin E whereby substantially a large percentage of the naturally occurring carotenes and Vitamin E is retained in the refined oil. More particularly the invention relates to a process of refining palm oil whereby substantially a large percentage of the naturally occurring carotenes and Vitamin E is retained in the refined oil.

It is a known fact that crude palm oil is rich in carotenes-a class of C40 polyunsaturated hydrocarbons. Commercially cultivated oil palm yield crude palm oil which contains 500–700 ppm carotenes of which α and β carotenes from 90% of the total carotenes. However, newer clones or new species of oil palm trees can produce crude palm oil with carotene concentrations of 1000–3000 ppm. The carotenes are known to possess pro-vitamin A properties and recent findings have shown that β-carotene also inhibits tumor progression and hence reduce cancer formation in animals, including humans. At present edible palm oil is used in the refined, bleached and deodorized form. However, the refining process of producing refined, bleached and deodorized form of oil commonly adopted in palm oil refining industry results in the carotenes being destroyed while the oil is being deodorized and deacidified. The refined oil of the prior art process normally has a free fatty acid (FFA) content of less than 0.1%, carotene content of less than 20 ppm and colour of less than 3 red in a 5¼" cell (Lovibond Scale). Prior art refining process of crude palm oil in summary involved, deodorising at temperatures between 240° C.–260° C. and at a pressure of 1–3 torr which processes resulted in not only the removal of unwanted fatty acids but also all carotenes being destroyed. α,β, Gamma and Zeta, zeacarotene, cis α-carotene, cis β-carotene and lycopene are destroyed.

In prior art plant configurations, degassing of the crude palm oil and deodorizing of the degassed oil is done within the same equipment. The typical operating temperature is between 240° C.–260° C. At this temperature levels, unwanted free fatty acids (FFA) are removed, but in the process all carotenes are broken down. If the operating temperature is lowered, then FFA is not completely removed to meet the specification stipulated for edible oil and the end product is not completely deodorized and the taste is not bland.

In recent times attempts had been made to produce refined palm oil wherein the naturally occurring carotenes and Vitamin E are retained in substantially large quantities. Australia Patent No. AU-B-31084189 granted to Palm Oil Research Institute of Malaysia discloses an improved process for the refining of edible palm oil substantially without destroying the carotenes present in the oil which process comprises the step of subjecting the oil to a pressure of less then 0.060 Torr and a temperature of less than 200° C. According to this invention palm oil or a product of palm oil is passed through a deodorizer, preferably at a temperature in the range 100° C.–200° C. and at a pressure in the range of 0.003–0.06 Torr. During this process the free fatty acids are distilled over and the oil deodorized, but the carotenes are not destroyed. This deodorized palm oil has a free fatty acid content of less than 0.12%. Carotene content and Peroxide values are almost the same as before the process. The refined oil has a bland smell. The examples disclosed in the said Australia patent, refer to laboratory scale reproductions of the invention. However on repeating the examples on a pilot plant scale or on a commercial plant scale showed different results. It was not possible to obtain yield of refined palm oil with the characteristics shown in Tables 1, 2, 3 or 4 of the AU Patent.

It is believed that gas, lights and free fatty acids at the molecular distillation stage create a strain on the distillation process. Increasing the operating temperature at the molecular distiller, reduces the level of FFA in the refined oil but at the same time destroys the carotene content in the oil. At operating temperatures of 100° C.–200° C. and at 0.003–0.060 Torr, all the FFA is not removed due to inefficient removal of condensed FFA in the condensation column.

Thus it is an object of this invention to provide a refining process wherein the FFA are removed to an acceptable level, the oil is deodorized to an acceptable level, the oil is rendered tasteless and the level of the carotene and Vitamin E present in crude palm oil substantially at levels exceeding 90% is retained in the refined oil.

SUMMARY OF THE INVENTION

The invention discloses a commercial process for the production of refined palm oil rich in natural carotene and Vitamin E. The process for the production of natural carotene rich refined and deodorised oil includes distilling the oil in a short path distillator at a temperature range of 160° C. to 210° C. and at pressures of 0.003 mbar to 0.08 mbar and removing free fatty acids (FFA) in the oil by condensation in the distiller. The FFA are removed by subjecting the mixture of the oil and FFA to an internal condenser system operating at a temperature greater than the melting point of FFA in the oil, typically operating at a temperature range of 20° C. to 80° C. The FFA in the oil is removed from the distiller by condensing FFA vapors immediately upon the oil and the vaporized FFA being introduced into the distiller.

DESCRIPTION OF THE PREFERRED EMBODIMENT

The condenser system within the distiller incorporates a flow therethrough of tempered water and wherein the temperature of tempered water is marginally greater than the melting point of FFA.

The oil that is introduced into the distiller unit is preferably preheated to 160° C. and has preferably been degassed, degummed and bleached. This oil can be any of the following degummed and bleached palm oil, degummed and bleached palm olein, degummed and bleached palm stearin, degummed and bleached palm mid-fraction, degummed and bleached super olein, crude palm mid-fraction and crude palm super olein, crude palm olein, crude palm stearin, crude palm oil or hybrid palm oil.

The invention further discloses a distiller for the production of natural carotene and Vitamin E rich refined and deodorised oil wherein the distiller includes internal condensing system to remove condensed FFA from the distiller.

In one embodiment of the invention, pretreated (degummed) crude palm oil or olein or stearin is pumped from an external storage tank at about 30° C.–50° C. via a steam heated pre-heater into a degasser equipment with or without a reflux condenser unit. The oil in the preheater is heated to and maintained at 80° C.–160° C. The operating pressure in the degasser unit is maintained between 0.5 mbar–5 mbar. Under these temperature and pressure conditions diluted gas, lights and some fatty acids are evaporated.

These evaporated vapors pass into a cooled reflux condenser unit cooled by water in a temperature range of 20° C.–60° C., whereby the fatty acids are condensed back in the degasser packings.

The rest of the vapors are condensed in an external cooled condenser at a temperature of −5° C. to +15° C. The degassed oil is pumped via another steam heated pre-heater where the temperature is between 160° C.–180° C. It is then pumped into a short-path distiller (molecular distiller) where at a temperature between 160° C.–210° C. and a pressure of 0.003–0.08 mbar the fatty acids are distilled off. These fatty acids are condensed in an internal condenser (within the short-path distiller) which is cooled by water maintained at 35° C.–80° C. The fatty acids condensed on the internal condenser are collected in a separate receiver and pumped to a storage tank by a discharge pump.

The residue from the distiller is pumped to a storage tank after cooling in a cooler to between 50° C.–70° C. The residue is refined palm oil rich in natural carotenes and Vitamin E. The refined oil has a free fatty acid content of less than 0.08% and is odorless and tasteless. The peroxide value of this refined oil is in the range of 0–1.0 meq/kg and has a minimum carotene content of 500 ppm and Vitamin E (tocopherols and tocotrienols) of 800 ppm. The loss of carotenes and Vitamin E during the process varies from 0 to 5%. The distillate (palm fatty acid distillate) has a carotene content of 30 ppm maximum and Vitamin E content of 1000–2500 ppm maximum and minimum 90% FFA. The colour of the residue is in the range of 19R to 25R in a 5¼" Lovibond Scale.

The distillation process requires different vacuums at different stages. The vacuum system is a combination of several vacuum pumps in series and in parallel. The operating vacuum pump for the distiller is an oil vapor jet vacuum pump. This pump is cooled by a special cooling water circuit. The cooling water inlet is maintained at 4–6 bar and at a temperature of 20° C.–30° C. The rest of the vacuum system consists of a series of Roots blowers and a liquid ring vacuum pump.

The vacuum system is protected by cold traps with different cooling coils wherein the temperatures of the coolant is maintained at various temperatures between −15° C. to +60° C. For heating the distiller, a USDA approved heating fluid (Food grade) is used.

The present invention will be illustrated by the following Examples.

EXAMPLE 1

Preheated (Degummed) Crude Palm Oil was preheated to 120° C. and degassed in the Degasser at 1 mbar pressure and passed through the Short-Path Distiller at the rate of 2000 kg/hr at a pressure of 0.008 mbar. The temperature of the water to the internal condenser was maintained at 57° C., through a temperature control system. The distiller temperature was maintained at 180° C. The natural carotene & vitamin E rich refined and deodorised oil and Palm Fatty Acid Distillate (PFAD) was found to have the characteristics as shown in Table 1.

TABLE 1

|  | Peroxide Value meq/kg | FFA % | Total Carotenes Content ppm | Vit E ppm |
|---|---|---|---|---|
| Pretreated (Degummed) Crude Palm Oil | 0.19 | 3.39 | 523 | 958 |
| Natural carotene & vitamin E rich refined & deodorised palm oil | Nil | 0.076 | 502 | 944 |
| PFAD | — | 90.50 | 28 | 1584 |

EXAMPLE 2

Pretreated (Degummed) Crude Palm Oil was preheated to 100° C. and degassed in the Degasser at 0.8 mbar pressure and passed through the Short Path Distiller at the rate of 1000 kg/hr at a pressure of 0.005 mbar. The distiller temperature was maintained at 175° C. The tempered water temperature to the internal condenser was maintained at 57° C. The natural carotene & vitamin E rich refined and deodorised oil and PFAD was found to have the characteristics as shown in Table 2.

TABLE 2

|  | Peroxide Value meq/kg | FFA % | Total Carotenes Content ppm | Vit E ppm |
|---|---|---|---|---|
| Pretreated (Degummed) | 0.25 | 3.390 | 552 | 886 |
| Natural carotene & vitamin E rich refined & deod palm oil | Nil | 0.054 | 545 | 865 |
| PFAD | — | 91.0 | 30 | 2124 |

That which is claimed is:

1. A process for the production of a natural carotene rich refined and deodorised oil by subjecting crude or pre-treated oil to a pressure of less than 0.060 mbar and a temperature of less than 200° C. characterised in that the process includes the steps of:
    a) distilling crude or pre-treated oil at a commercial scale rate of at about 1000 kg/hr in a short-path distiller at a temperature range of 160° C. to 200° C. and at pressures of 0.003 mbar to 0.08 mbar, and
    b) removing free fatty acids (FFA) in the oil by condensation within the distiller wherein said step of removing FFA comprises subjecting the mixture of the oil and FFA to an internal condenser operating at a temperature in the range of between the melting point of FFA and a temperature lower than the condensing point of FFA to condense FFA vapors immediately upon the oil with FFA being introduced into the distiller; to produce a natural carotene rich refined and deodorized oil containing a minimum of 90% of the carotene and vitamin E present in the pretreated oil before being fed into the distiller and containing less than 0.1% of FFA.

2. A process for the production a natural carotene rich refined and deodorized oil by subjecting crude or pre-treated oil to a pressure of less than 0.060 mbar and a temperature of less than 200° C. characterized in that the process includes the steps of:
    a) distilling crude or pre-treated oil at a commercial scale rate of at about 2000 kg/hr in a short-path distiller at a temperature range of 160° C. to 200° C. and at pressures of 0.003 mbar to 0.08 mbar, and
    b) removing free fatty acids (FFA) in the oil by condensation within the distiller wherein said step of removing FFA comprises subjecting the mixture of the oil and FFA to an internal condenser operating at a temperature in the range of between the melting point of FFA and a temperature lower than the condensing point of FFA to condense FFA vapors immediately upon the oil with FFA being introduced into the distiller; to produce a natural carotene rich refined and deodorized oil containing a minimum of 90% of the carotene and vitamin E present in the pre-treated oil before being fed into the distiller and containing less than 0.1% of FFA.

3. A process of production of a natural carotene rich refined and deodorized oil by subjecting crude or pre-treated oil to a pressure of less than 0.060 mbar and a temperature of less than 200° C. characterized in that the process includes the steps of:

a) distilling crude or pre-treated oil at a commercial scale rate of 1000 kg/hr to 2000 kg/hr in a short-path distiller at a temperature range of 160° C. to 200° C. and at pressures of 0.003 mbar to 0.08 mbar, and at pressures of 0.003 mbar to 0.08 mbar, and b) removing free fatty acids (FFA) in the oil by condensation within the distiller wherein said step of removing FFA comprises subjection the mixture of the oil and FFA to an internal condenser operating at a temperature in the range of between the melting point of FFA and a temperature lower than the condensing point of FFA to condense FFA vapors immediately upon the oil with FFA being introduced into the distiller; to produce a natural carotene rich refined and deodorized oil containing a minimum of 90% of the carotene and vitamin E present in the pre-treated oil before being fed into the distiller and containing less than 0.1% of FFA.

4. A process as claimed in claim 1 or 2 or 3 wherein the oil is preheated up to 160° C. and has been degassed.

5. A process as claimed in claim 4 wherein the oil is degassed in a degasser unit with a reflux condenser.

6. A process as claimed in claim 1 or 2 or 3 wherein the internal condenser incorporates a flow therethrough of tempered water and wherein the temperature of tempered water is marginally greater than the melting point of FFA.

7. A process as claimed in claim 1 or 2 or 3 wherein the oil is degummed and bleached oil.

8. A process as claimed in claim 1 or 2 or 3 wherein the oil is crude or pre-treated palm oil.

9. A process as claimed in claim 8 where the oil is selected from degummed and bleached oil, degummed and bleached palm oil, degummed and bleached palm olein, degummed and bleached palm stearin, crude palm olein, crude palm stearin, degummed and bleached palm mid-fraction, degummed and bleached palm super olein, crude palm mid-fraction, crude palm super olein, crude palm oil or hybrid palm oil.

10. An oil refining process according to claim 1 or 2 or 3 wherein said process is carried out under vacuum by a vacuum system wherein the vacuum system is protected by a plurality of cold traps with different cooling coils wherein the temperatures can be independently varied from −15° C. to +5° C. during operation and up to 60° C. during defrosting.

11. A process as claimed in claim 1 or 2 or 3 wherein said internal condenser operating temperature is about 57° C.

* * * * *